US00RE41284E

(19) United States
(12) Reissued Patent
Bruder

(10) Patent Number: US RE41,284 E
(45) Date of Reissued Patent: Apr. 27, 2010

(54) TOY GARBAGE TRANSPORTATION TRUCK

(75) Inventor: Paul Heinz Bruder, Seukendorf (DE)

(73) Assignee: Bruder Spielwaren GmbH & Co. KG (DE)

(21) Appl. No.: 10/764,383

(22) Filed: Jan. 21, 2004

Related U.S. Patent Documents

Reissue of:
(64) Patent No.: 6,485,351
Issued: Nov. 26, 2002
Appl. No.: 09/875,129
Filed: Jun. 7, 2001

(30) Foreign Application Priority Data

Jan. 26, 2001 (EP) ..... 01101761

(51) Int. Cl.
*A63H 33/30* (2006.01)

(52) U.S. Cl. ..... 446/427; 446/465
(58) Field of Classification Search ..... 446/424, 446/425, 427, 428, 431, 465
See application file for complete search history.

(56) References Cited

U.S. PATENT DOCUMENTS 4,917,648 A 4/1990 Hartje
5,378,191 A 1/1995 Ryaa
5,435,768 A 7/1995 Dunleavy
6,485,351 B2 * 11/2002 Bruder ..... 446/427

* cited by examiner

*Primary Examiner*—Jacob K Ackun, Jr.
(74) *Attorney, Agent, or Firm*—Ostrolenk Faber LLP

(57) ABSTRACT

In a toy garbage transportation truck comprising a cargo space (3) for the garbage that is to be disposed of, having an opening (4) on its rear to which an emptying casing (5) for garbage cans that are to be emptied is adjoined that has a rear discharge opening (7), provision is made that the floor (9) below the discharge opening is curved approximately in the shape of a segment of a circle, the floor (9) transitions into a slanted feeding surface (10) that extends to below a feeding opening (6), the conveyor shovel (12) is disposed above the floor (9), the conveyor shovel (12) can be swiveled along the floor (9) above the same, lifted parallel to the slanted feeding surface (16) to at least the lower edge of the feeding opening (6) and subsequently swiveled back and lowered to reach the end of the floor (9) on the opening side and repeat the conveyor movement again.

13 Claims, 7 Drawing Sheets

TOY GARBAGE TRANSPORTATION TRUCK

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention is directed to a toy garbage transportation truck comprising a cargo space for the garbage that is to be disposed of, having an opening on its rear to which an emptying casing for garbage cans that are to be emptied is adjoined that has a rear discharge opening.

2. Background Art

Toy vehicles of this type are intended to copy the large original in their outer appearance while leaving out details and are further intended to permit an imitation of the functions of such vehicles.

SUMMARY OF THE INVENTION

Starting from a vehicle of this type according to the preamble, the invention therefore has as its object to create the greatest possible play incentive in such a way that the vehicle incorporates a high functionality while ensuring a simple operation that is appropriate for a child, and especially also sturdiness over a long period of time.

This object is met according to the invention in such a way that the floor below the discharge opening is curved approximately in the shape of a segment of a circle and transitions into a slanted feeding surface extending to below a feeding opening, that a conveyor shovel is disposed above the floor, that said conveyor shovel can be swiveled along the floor above the same, lifted parallel to the slanted feeding surface to at least the lower edge of the feeding opening and subsequently swiveled back and lowered to then reach the end of the floor on the discharge opening side and repeat the conveyor movement again.

It is thus possible to imitate, by means of a relatively simple kinematic sequence, the very complicated hydraulically actuated sequence of movements of the natural model and implement a play function that is very attractive for the child.

In a further improvement of the invention, provision is made for the transporting movement of the conveyor shovel to be manually driven by means of a turning knob mounted in a side wall of the emptying casing.

The actuating turning knob may be provided with a gearing that is in engagement with the gearing of a transfer wheel that is also mounted on the side wall. In this way an overload protection is implemented, as the carriers of the gearing may elastically give way when the playing child continues to turn the actuating turning knob after a blockage has occurred, resulting in a slipping of the gearing.

A particularly advantageous mechanical design is implemented in such a way that the transfer wheel incorporates a radially extending guide slot into which a cam peg engages that extends, parallel to the swivel bearing axis of the conveyor shovel at a distance to the same, away from a transfer member located on the swivel bearing, said swivel bearing of the conveyor shovel being guided along a that extends approximately parallel to the slanted feeding surface at a partition wall formed parallel to the casing wall.

It is thus made possible to convert a simple turning motion into a lifting-swivel-lowering motion in such a way that the swivel motion of the conveyor shovel at the respective lower or upper end of the lifting path is created in such a way that the first guide slot that revolves by 360° with the transfer wheel approaches the respective upper or lower radial overlapping position with the second guide slot and passes over this overlapping position.

The emptying casing may be mounted at the rear upper edge of the cargo space in a manner so that it can be swiveled upward and locked in this position.

An emptying pusher advantageously extends crosswise through the cargo space and is mounted in a manner so that it can be moved in the longitudinal direction by means of a turning knob, which is operated from the outside and has an inside gearing, and a toothed rack in order to thus accomplish a discharging movement.

In the region of the lower edge of the discharge opening for the garbage cans, a receiving device for the garbage cans may be disposed that can be swiveled upward by means of a lateral pivoted lever.

The invention will be explained in more detail below based on a preferred embodiment in combination with the drawing.

DESCRIPTION OF THE PREFERRED EMBODIMENT

Figure 1:
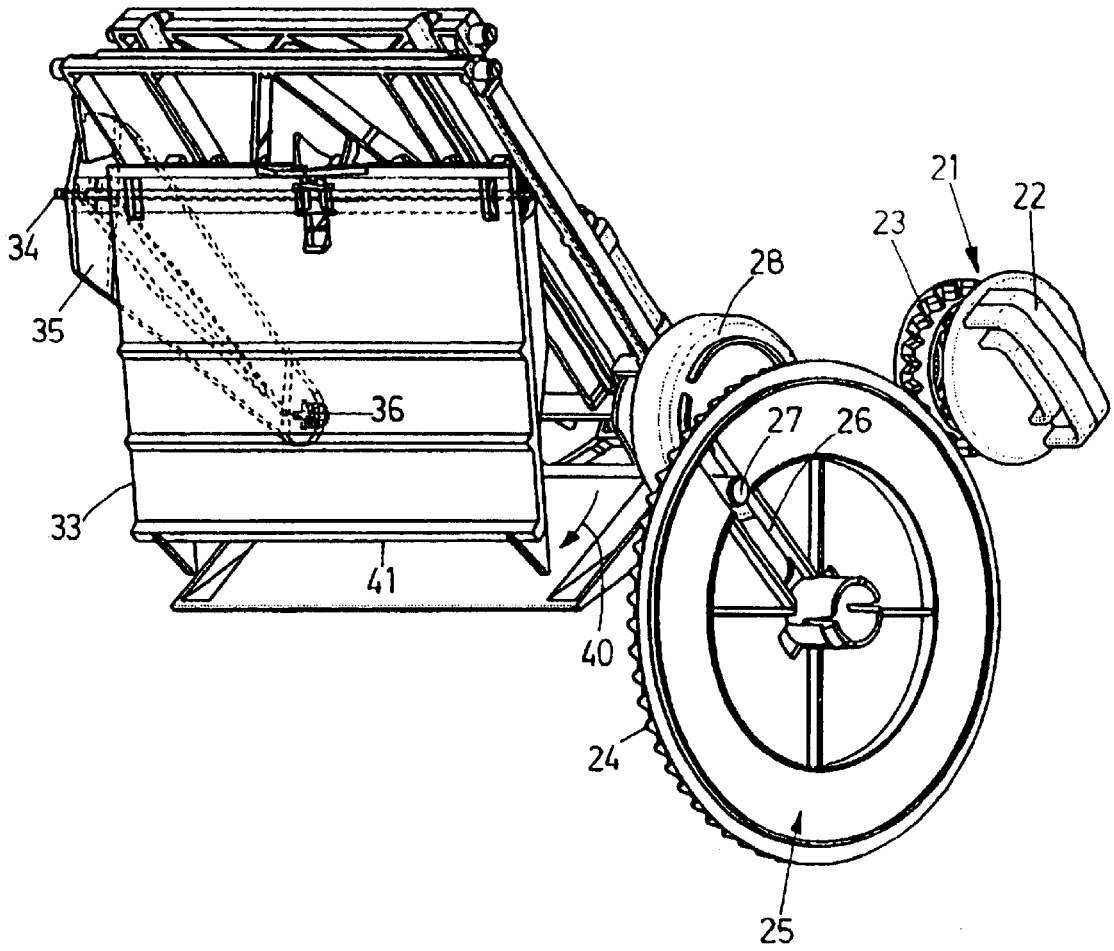
FIG. 1 shows a perspective view of the function-essential parts of an inventive vehicle without side and cross walls.
Figure 2:
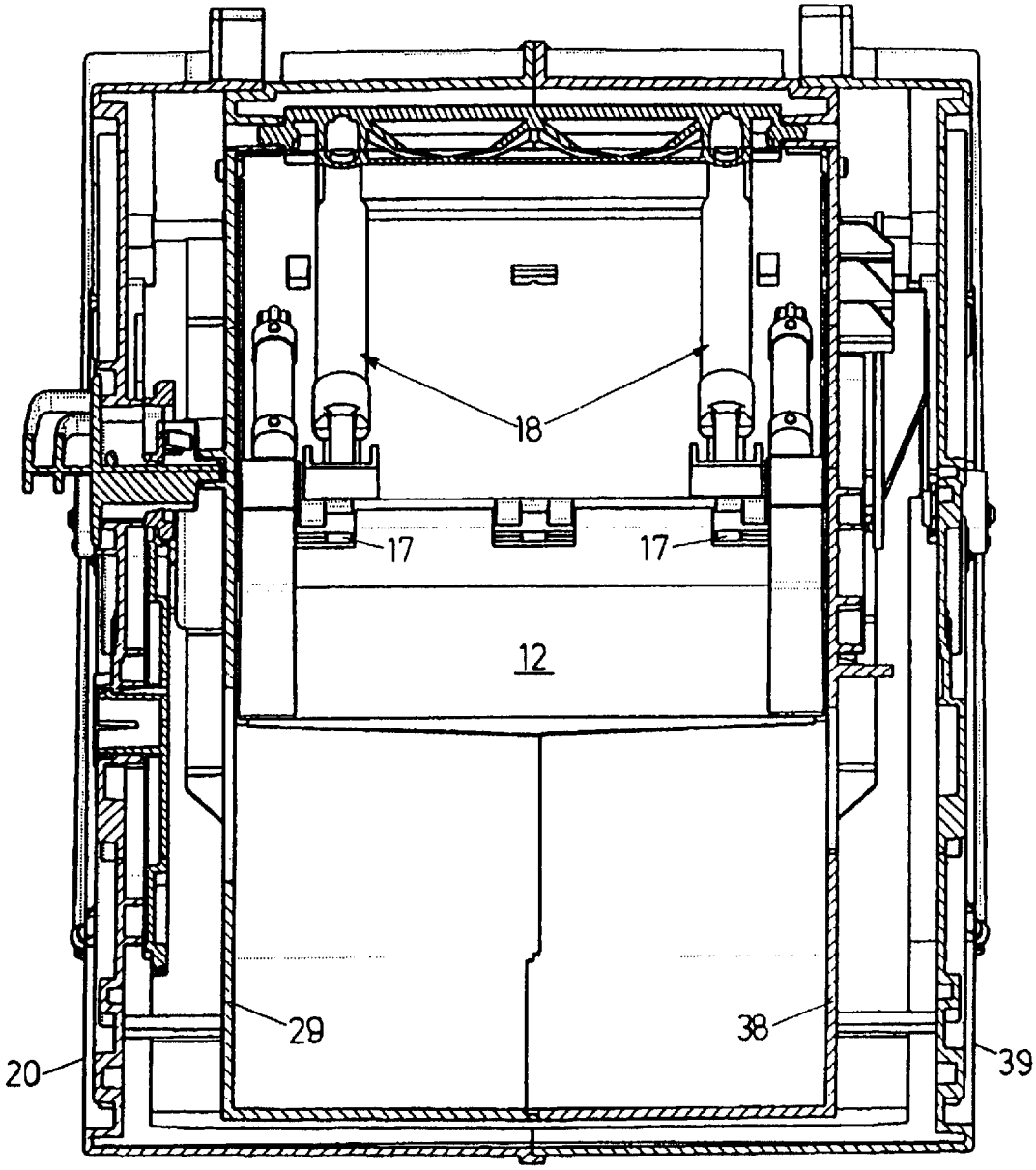
FIG. 2 shows a cross section seen from behind.
Figure 3:
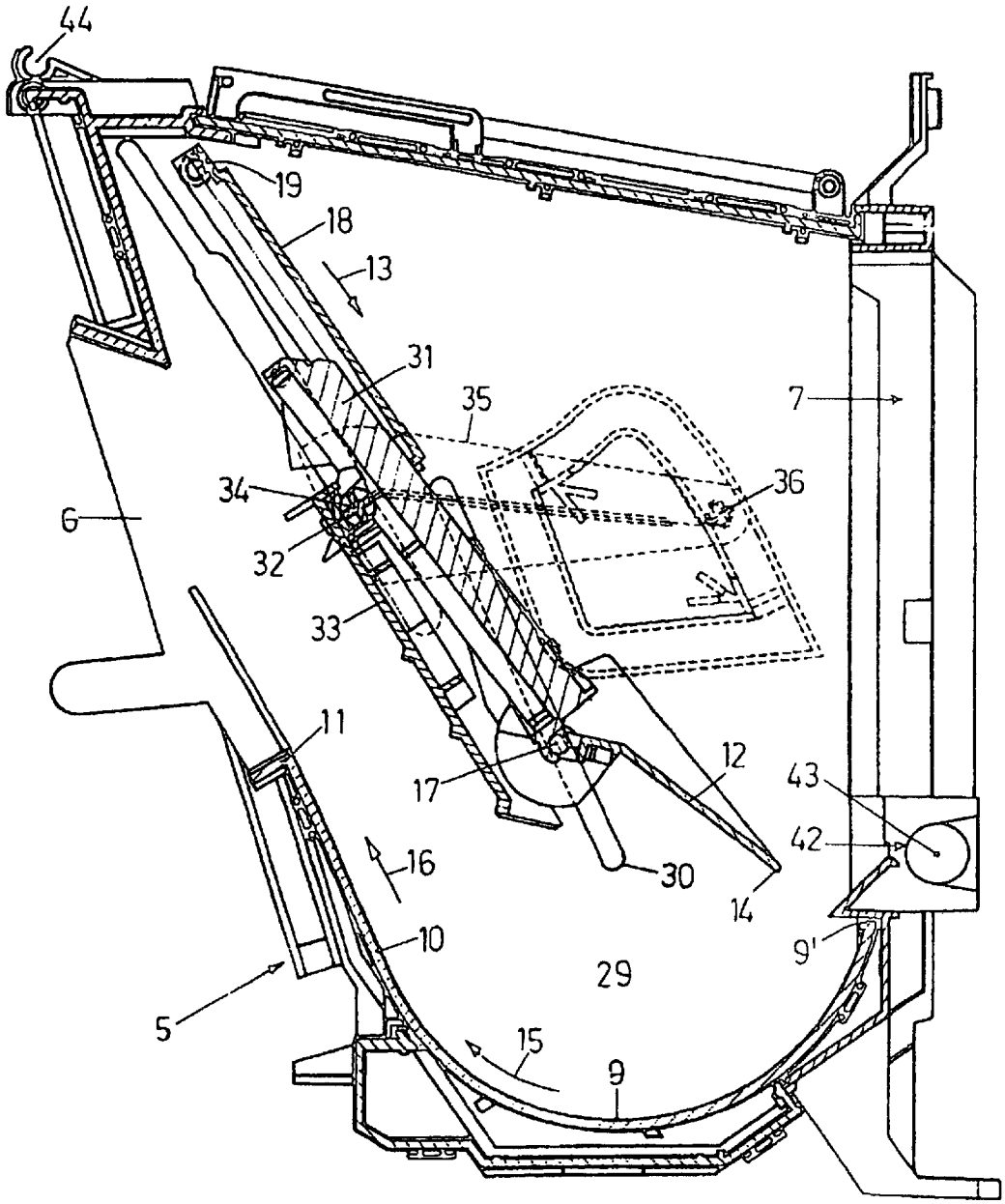
FIG. 3 shows a section of the right side, viewed in the driving direction, along the center longitudinal plane.
Figure 4:
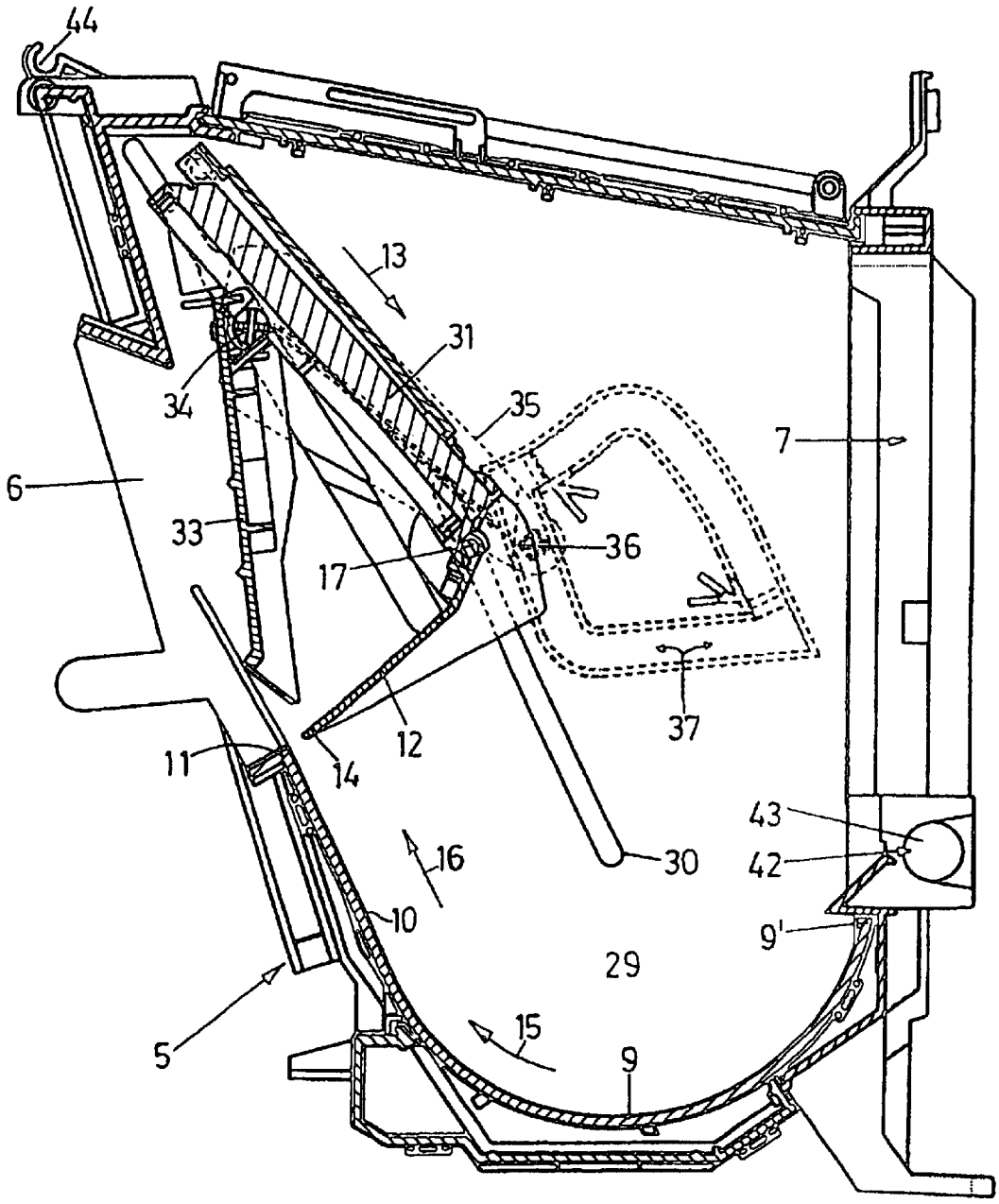
FIG. 4 shows an illustration corresponding to FIG. 3 with a conveyor shovel swiveled by 90°.

A toy vehicle 1 shown in the drawing comprises, on a chassis 2, a cargo space 3 having a rear opening 4 and an adjoining emptying casing 5 for garbage cans not shown in the drawing.

The emptying casing 5 has a feeding opening 6 that is aligned with the opening of the cargo space 4 and also a rear discharge opening 7 for the garbage cans.

A floor 9, the cross-section of which is a segment of a circle and which transitions into a slanted feeding surface 10, the upper edge 11 of which practically forms the lower edge of the feeding opening 6, extends from the region of the lower edge 8 of the discharge opening 7.

Above the floor 9 a conveyor shovel 12 is mounted that can be lowered in the direction of the arrow 13 to pick up garbage emptied onto the floor 9 from the garbage cans and then, when its lower edge 14 has reached the outer end 9' of the floor 9, swiveled concentrically to the floor 9 in the direction of the arrow 15 and subsequently lifted in the direction of the arrow 16 parallel to the slanted feeding surface 10 so that the garbage picked up by the conveyor shovel 12 from the floor 9 can be deposited over the upper edge 11 of the slanted feeding surface 10 into the feeding opening 6 and thus into the cargo space 3.

The conveyor shovel 12 is swivel-mounted around a swivel bearing 17 which, in turn, is mounted on a telescoping guide 18, the upper end of which is fixed to a swivel bearing 19.

The conveyor movement of the conveyor shovel 12 is accomplished as follows:

On an outer side wall 20 of the emptying casing 5 an actuating turning knob 21 is rotatably mounted, which has an outer handle 22 and on the inside a circumferential gearing 23 that is in combing engagement with a corresponding gearing 24 on a transfer wheel 25, which is also rotatably mounted in the side wall 20, below the actuating turning knob 21. With this design of the transfer of movements an overload protection is thus implemented.

The transfer wheel 25 has a first guide slot 26 that extends radially outward, into which a cam peg 27 engages from the inside, which is mounted on a transfer member 28 in a manner so that its projects to the outside. The transfer member 28 is designed wheel-like and disposed and mounted coaxially with the swivel bearing 17 of the conveyor shovel 12.

Within the actuating button 21, the transfer wheel 25 and the transfer member 28, a partition wall 29 is formed that is parallel to the outside wall 20 and has a second guide slot 30 extending away from the swivel bearing 17, parallel to the slanted feeding surface 10 at a distance from the same, corresponding approximately to the radial extension of the conveyor shovel 12, along which guide slot 30 the swivel bearing 17 of the conveyor shovel 12 is guided on the inside and, coaxially to the same on the outside, the transfer member 28.

Figure 5:
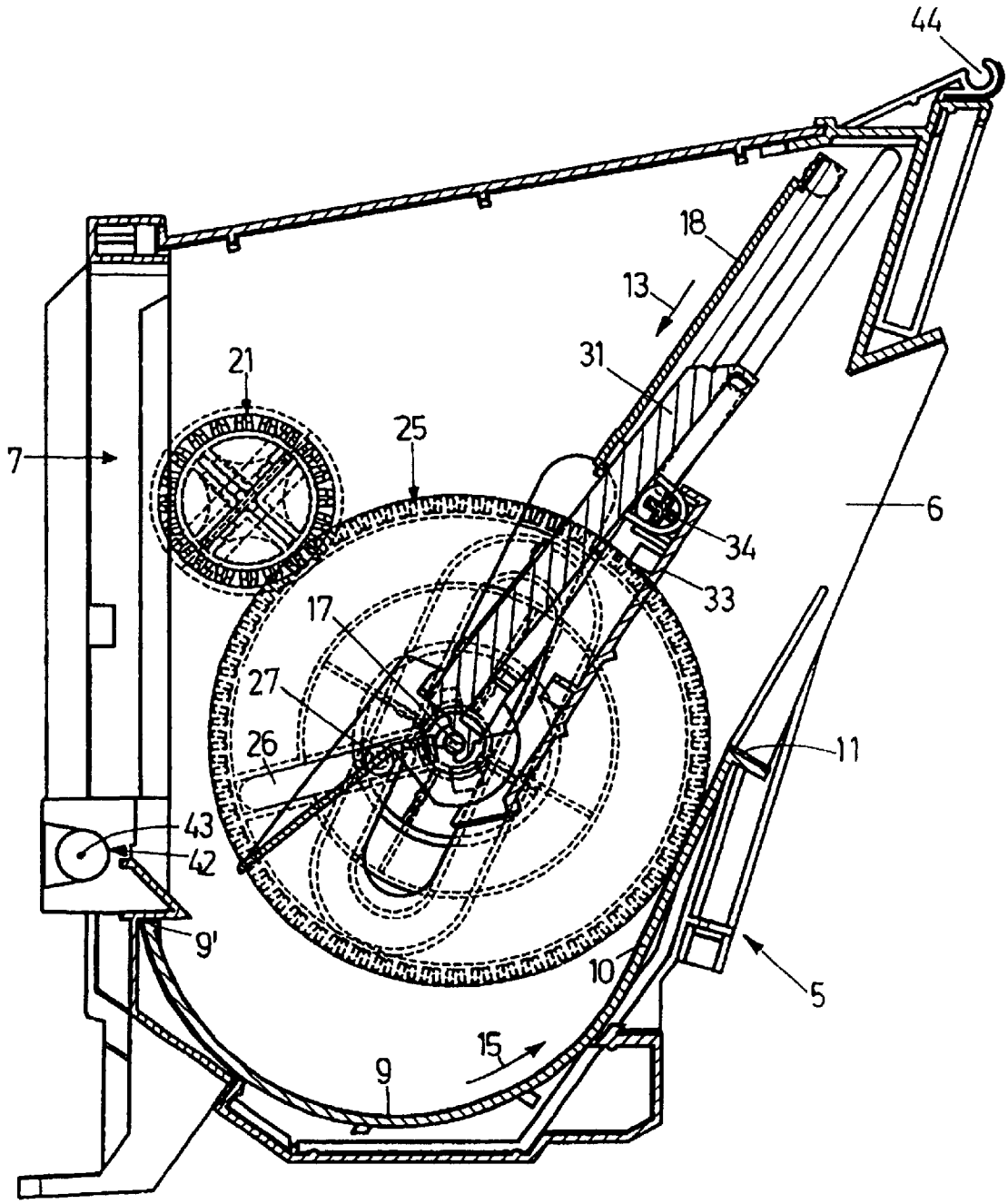
FIG. 5 shows a section along the center longitudinal plane on the left side, viewed in the driving direction.
Figure 6:
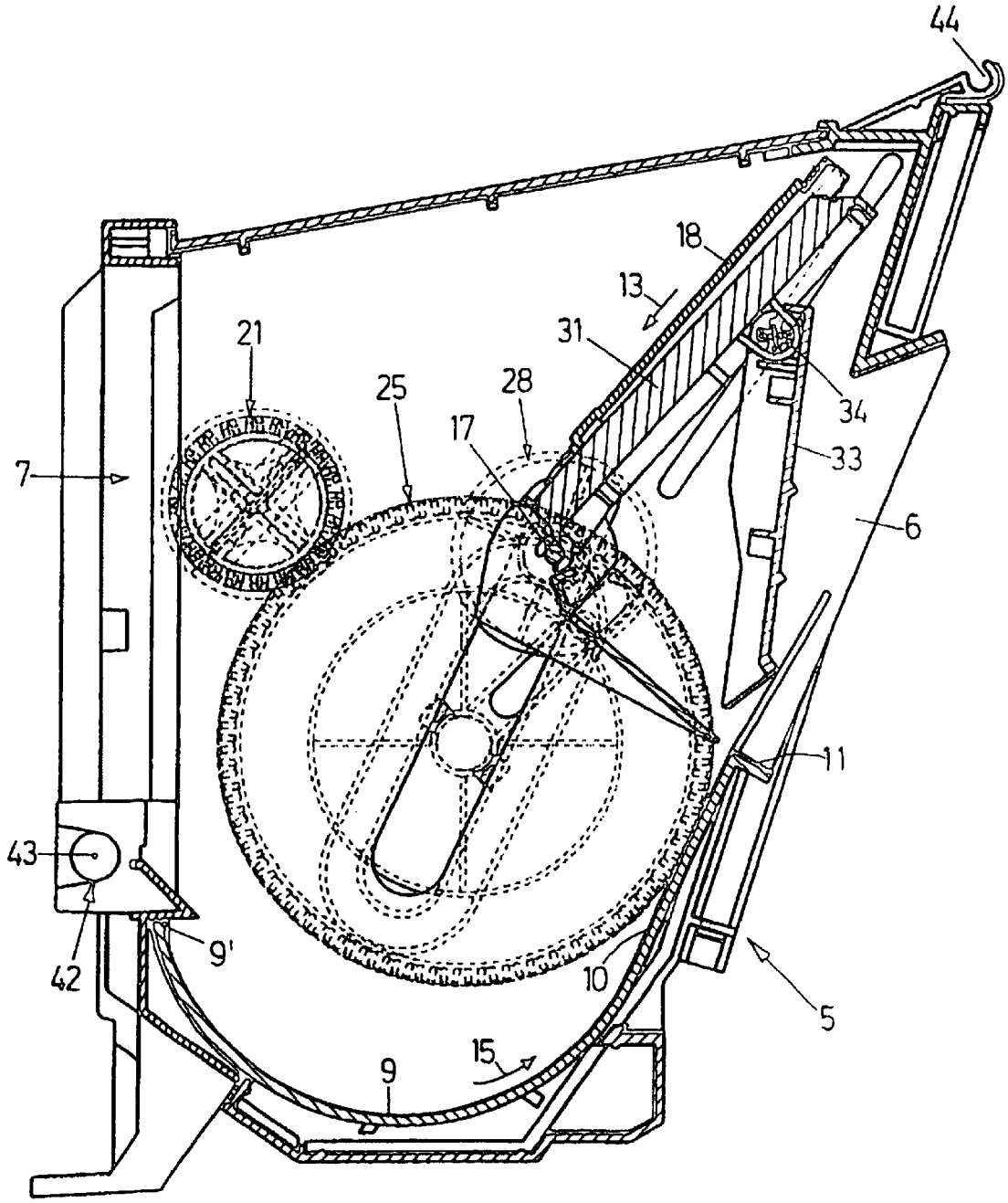
FIG. 6 shows an illustration corresponding to FIG. 5 with the conveyor shovel swiveled further by 90°.
Figure 7:
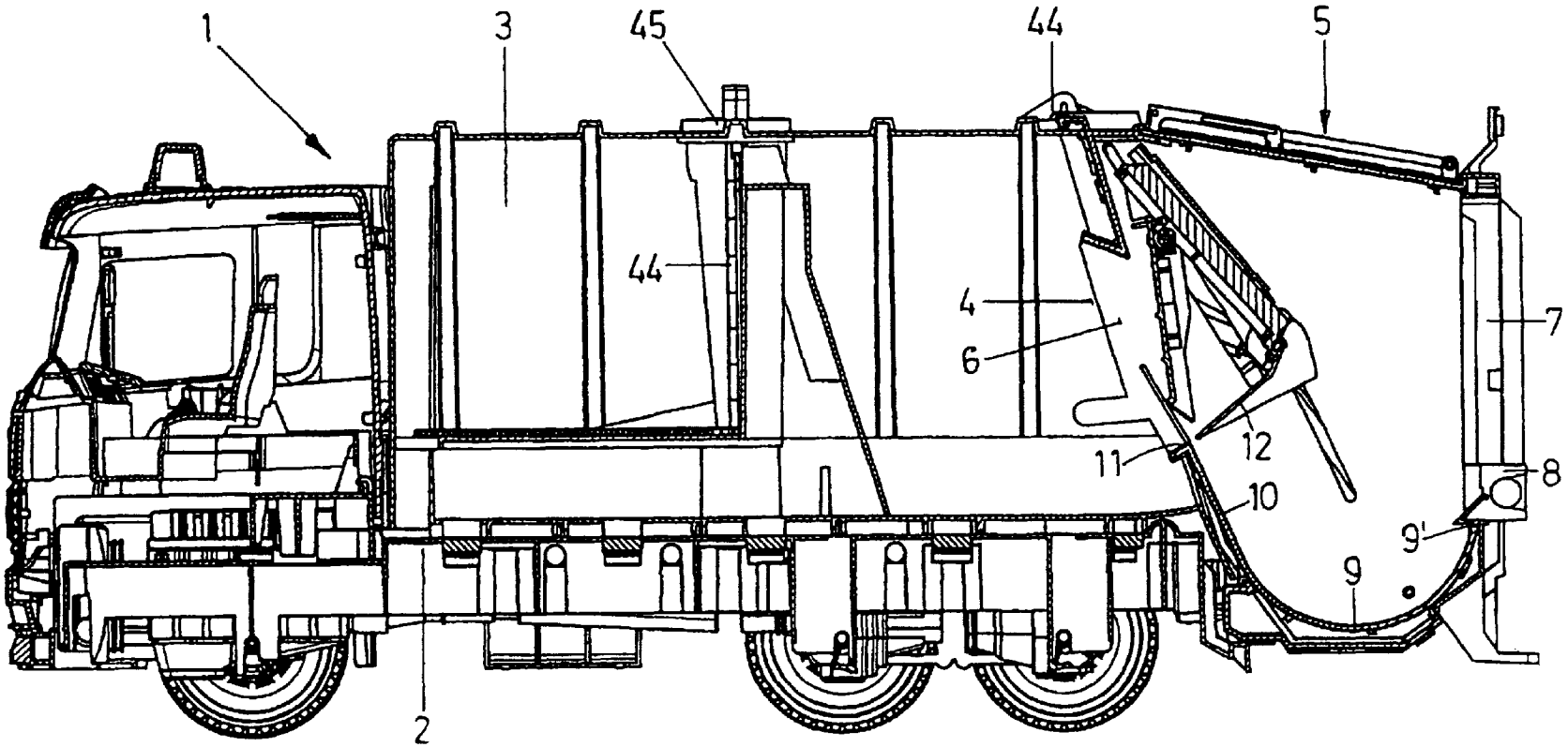
FIG. 7 shows a schematic longitudinal section through the entire vehicle.

When the actuating turning knob 21 is turned, its rotating movement is transferred to the transfer wheel 25, which moves the cam peg 27 along via the first guide slot 26. The guide slot 26 accordingly performs, during a conveyor phase of the conveyor shovel 12, a rotation of 360° and, in the process, overlaps with the second guide slot 30 in an upper position, as shown in FIG. 5 and in a lower position not shown in the drawing.

Between these two overlapping positions the relative position of the two guide slots 26, 30 results in the rotating movement of the transfer wheel 25 being converted into a lifting movement in the direction of the arrow 16 or into a lowering movement in the direction of the arrow 13 while the rotating movement in the region from shortly in front through shortly behind the respective upper or lower overlapping position is converted into a swivel movement (arrow 15) of the conveyor shovel 12.

With the inventive design it is thus possible to implement, with a simple motion of rotation that can easily be accomplished by the playing child, a comparatively complicated conveyor movement of the conveyor shovel 12 comprising a lower swivel movement, a lifting movement, an upper return swivel movement and a lowering movement.

Above the swivel bearing 17 of the conveyor shovel 12, a plate 31 is formed that extends approximately parallel to the slanted feeding surface 10. On this plate 31 a scraper shovel 33 is mounted via a swivel bearing 32 in a manner so that it can be swiveled downward to the left.

The scraper shovel 33 has a bearing shaft 34. The same is designed as a cross profile and acts as a torsion spring. It is connected, integral in rotation with the same, to a projection 35 that engages with a cam projection 36 into a cam guide track 37 that is formed on an partition wall 38, which extends parallel to the right side wall 39 of the emptying casing 5 shown in the drawing, so that the projection 35 is disposed between this partition wall 38 and the outer side wall 39.

Based on the shape of the cam guide track 37 and the torsion spring character of the bearing shaft 34, a pretensioning of the torsion spring is achieved when the conveyor shovel 12 is moved upward since the scraper shovel 33 is pretensioned against the conveyed garbage. As soon as the upper edge 11 of the slanted feeding surface 10 is reached by the conveyor shovel 12, the scraper shovel 33 pushes the garbage into the cargo space due to the pretension of the spring and relaxes in the process.

An emptying device 42 for the garbage cans is formed on the rear of the emptying casing 5 in the region of the lower edge of the discharge opening 7. Two garbage cans that are to be emptied may be placed there and swiveled upward by means of a pivoted lever not shown in the drawing around a swivel axis 43 so that the content of the garbage cans is emptied through the discharge opening 7 onto the floor 9.

In the cargo space 3, an emptying pusher 44 is disposed that extends crosswise through the cargo space 3 and can be slid longitudinally via a turning knob 45 provided on top of the cargo space 3, a gearing on the turning knob 45, and a toothed rod, so that the garbage is transported within the cargo space 3 and can also be discharged through the opening 4 of the cargo space. The emptying casing can be swiveled upward for this purpose around a swivel bearing 44 and releasably locked in the swiveled-up position via a telescoping device.

What is claimed is:

1. A toy garbage transportation truck comprising:

a cargo space (3) for the garbage having an opening (4) on a rear of the cargo space (3);

an emptying casing (5) for garbage adjoining the cargo space (3) and having a rear discharge opening (7), wherein;

a floor (9) below the discharge opening (7) is curved approximately in a shape of a segment of a circle;

a floor (9) transitions into a slanted feeding surface (10) that extends to below a feeding opening (6) aligned with the opening (4) on the rear of the cargo space (3);

a conveyor shovel (12) is disposed above the floor (9);

the conveyor shovel (12) can be swiveled above and along the floor (9), lifted parallel to the slanted feeding surface (10) to at least a lower edge (11) of the feeding opening (6) and subsequently swiveled back and lowered to reach an end of the floor (9) under discharge opening (7) where a same movement of the conveyor shovel (12) can be repeated.

2. A vehicle according to claim 1, wherein a transporting movement of the conveyor shovel (12) is driven by an actuating turning knob (21) mounted in a side wall (20) of the emptying casing (5).

3. The vehicle according to claim 2, wherein the actuating knob (21) is provided with a gearing (23) that is in engagement with gearing (24) of a transfer wheel (25) that is also mounted on the side wall (20).

4. A vehicle according to claim 3, wherein the transfer wheel (25) has a radially extending first slot (26), and a transfer wheel (28) has a cam peg (27) which is slidably engaged in the first slot (26), the cam peg (27) extending parallel to an axis of a swivel bearing (17) of the conveyor shovel (12);

wherein the transfer member (28) is mounted coaxially with the swivel bearing (17) which is guided along a second guide slot (30) in a partition wall (29) formed parallel to the side wall (20), the second guide slot (30) being parallel to the slanted feeding surface (10).

5. A vehicle according to claim 4, wherein a swivel motion of the conveyor shovel (12) at a respective lower or upper end of a lifting path is accomplished in such a way that the first guide slot (26) that revolves by 360° with the transfer wheel (25) approaches a respective upper or lower radial overlapping position with the second guide slot (30) and passes over the overlapping position.

6. A vehicle according to claim 4, wherein the swivel bearing (17) is mounted on a telescoping guide (18) which, in turn, is also swivel mounted.

7. A vehicle according to claim 6, wherein a scraper shovel (33) is pendulously mounted on the telescoping guide (18) in such a way that a lower edge (14) of the scraper shovel (33) swings along the conveyor shovel (12) when the conveyor shovel (12) is located in a depositing position at an upper edge (11) of the slanted feeding surface (10).

8. A vehicle according to claim 7, wherein a bearing shaft (34) of the scraper shovel (33) is integrally connected in rotation with the scraper shovel, to a projection (35) that engages with a cam projection (36) into a cam guide track (37) that is formed on a partition wall (38), which extends parallel to one of side walls (39).

9. A vehicle according to claim 1, wherein the emptying casing (5) is mounted on a rear upper edge (11) of the cargo space (3) so that it can be swiveled upward.

10. A vehicle according to claim 9, wherein the emptying casing (5) can be locked in a swiveled-up position.

11. A vehicle according to claim 1, wherein an emptying pusher extends crosswise through the cargo space (3) and is mounted so that it can be moved in the longitudinal direction by means of an actuating turning knob, which is operated from the outside and has an inside gearing, and a toothed rack.

12. A vehicle according to claim 1, wherein a receptacle for garbage cans that can be swiveled upward by a lateral pivoted lever disposed in the region of a lower edge (14) of the discharge opening (6) for the garbage cans.

*13. A toy garbage transportation truck comprising:*

*a cargo space for the garbage having an opening;*

*an emptying casing for garbage adjoining the cargo space and having an opening that adjoins the opening of the cargo space, wherein:*

*a floor below the opening of the empty casing is curved approximately in a shape of a segment of a circle;*

*the floor transitions into a slanted feeding surface that extends to the opening of the cargo space;*

*a conveyor shovel is disposed above the floor;*

*the conveyor shovel can be swiveled above and along the floor, lifted parallel to the slanted feeding surface to at least a lower edge of the opening of the cargo space and subsequently swiveled back and lowered to reach an end of the floor where a same movement of the conveyor shovel can be repeated.*

* * * * *